United States Patent [19]

Comerford et al.

[11] Patent Number: 5,303,312
[45] Date of Patent: Apr. 12, 1994

[54] HANDWRITING RECOGNITION BY CHARACTER TEMPLATE

[75] Inventors: Liam D. Comerford, Carmel; Stephen E. Levy, Thornwood, both of N.Y.

[73] Assignee: International Business Machines Corporation, Armonk, N.Y.

[21] Appl. No.: 942,118

[22] Filed: Sep. 8, 1992

Related U.S. Application Data

[63] Continuation of Ser. No. 688,786, Apr. 19, 1991, abandoned.

[51] Int. Cl.$^5$ .............................................. G06K 9/00
[52] U.S. Cl. .................................... 382/13; 382/11; 382/30
[58] Field of Search .................. 382/13, 12, 11, 29, 382/30; 340/706; G06K 9/00, 9/18, 9/46, 9/62; G09G 3/02

[56] References Cited

U.S. PATENT DOCUMENTS

| | | | |
|---|---|---|---|
| 3,776,454 | 12/1973 | Jones | 382/11 |
| 4,132,976 | 1/1979 | Siegal | 382/11 |
| 4,953,226 | 8/1990 | Matsuyama | 382/13 |

FOREIGN PATENT DOCUMENTS

| | | | |
|---|---|---|---|
| 62-2378 | 1/1987 | Japan | 382/13 |
| 62-20090 | 1/1987 | Japan | 382/13 |
| 62-5489 | 12/1987 | Japan | 382/13 |
| 2-282883 | 11/1990 | Japan | 382/13 |

OTHER PUBLICATIONS

Teiltelman, "Real-time recognition of hand-drawn characters", Proc. of the Fall Joint Computer Conf, Oct. 1964, San Francisco, pp. 559–575.
W. C. Lin et al, "Computer identification of constrained handprinted characters with a high recognition rate", IEEE SMC vol. 4, No. 6, Nov. 1974, pp. 497–504.
Proc. of the Eastern Computer Conf. 1957, p. 236.
D. A. Young, "Automatic character recognition", Electronic Engineering, vol. 32, Jan. 1960, pp. 2–10.

*Primary Examiner*—Yon J. Couso
*Attorney, Agent, or Firm*—Whitham & Marhoefer

[57] ABSTRACT

A method for entry and recognition of elements from a set of symbols, involving a template of line segments displayed on an electronic writing surface. A stylus is applied to the electronic writing surface so as to trace a desired symbol. A computing arrangement is used to "snap" the strokes made by the stylus onto the corresponding template line segments. Upon completion of a symbol, a code is made to represent the line segments and this code is used to reference entries in a data structure to identify the appropriate corresponding computer code. If there is no match, the code for the line segments and a corresponding set of computer codes can be added to the table. This method takes advantage of natural handwriting skills and can be used for a variety of symbol sets.

18 Claims, 8 Drawing Sheets

| a | b | c | d | e |
|---|---|---|---|---|
| THE TEMPLATE IS DISPLAYED | THE USER ENTERS A STROKE | THE STROKE IS SNAPPED TO THE TEMPLATE | THE NEXT STROKE IS ENTERED | THE STROKE IS SNAPPED TO THE TEMPLATE |

ENCODE

REFERENCE

NEW ENTRY

LIGATURES 44

LOOPS 45

HANDWRITING RECOGNITION BY CHARACTER TEMPLATE

This application is a continuation of application Ser. No. 07/688,786 filed Apr. 19, 1991 now abandoned.

BACKGROUND OF THE INVENTION

1. Field of the Invention

The present invention generally relates to character entry and recognition systems and, more particularly, to use of character template on an electronic writing surface to structure a dialogue between the user and a computing system during the character entry phase so as to simplify and make more reliable the character recognition phase.

2. Description of the Prior Art

Portable notebook computers utilizing handwriting interfaces are thought to offer substantial benefits to users in circumstances where keyboards may not be used. Such computers incorporate software systems for recognizing handwritten characters and converting them to a coded form which is conventionally "understood" by computers. Modern handwriting recognition systems are at best insufficient for many of these applications, hence, frequent error correction steps are necessary by the user to obtain the desired text. The larger the number of steps required to generate an accurate sentence, the less usable the system is.

Prior art systems correct errors using one or more of the following strategies: 1) rewriting of character(s) in error; 2) alternate recognized character selection; 3) using a soft keypad to generate correct character. The first strategy has been found to fail often. The second strategy is easy to use, but if the desired character is not in the list an additional strategy must be employed. The third strategy is highly accurate, but requires a large percentage of screen space to display all possible character choices.

Current recognition systems are limited as to the forms of handwriting they can recognize. Cursive writing recognition is not generally available. Recognition of cursively written characters is complicated by the fact that the characters are written as a single connected line. Separation of the characters at the inter-character ligatures is often difficult even for humans. Detecting this separation and then recognizing the separated character bas been computationally expensive for computerized recognition systems.

Prior relevant art may be divided into two categories. In one category are those which deal with entry of characters on paper followed by recognition with an electronic apparatus. These methods resemble the present invention to the extent that the phases of character creation and character recognition are clearly separated and that the user must be satisfied with the production before submitting it to recognition. However, in each of these methods the flow of information through the system is unidirectional. The user does not see any production of the computing system until the recognition is complete. Furthermore, in order to simplify what would otherwise be an extremely difficult recognition task, most of these methods directly constrain the handwriting style of the user.

U.S. Pat. No. 3,485,168 to Martinson discloses a means for accurately writing characters to be submitted for "optical character recognition". In this system, an instrument is used to "develop" the elements of a pattern placed on a work surface. The characters are thus accurately formed and registered, which simplifies the electronic part of the recognition system. However, the Martinson invention guides the user to create optically recognizable characters by the appearance of lines only in the event that the user applies the "writing instrument" to a pretreated region of the work sheet. No line appears which follows the locus of the stylus in any arbitrary area to which the stylus is applied. Thus the failure to correctly "develop" a line is indicated to the user by the appearance of incomplete line traces. There is no mechanism for determining that the line traced by the stylus is close to a predefined line segment; instead, the line segments themselves are made very wide, which limits the "template" to highly stylized line segments. Furthermore, no correction means for inadvertently marked lines is described by the Martinson patent. The claims of the Martinson patent explicitly call for a physical "work sheet" and "ink".

In U.S. Pat. Nos. 4,132,976 and 4,275,381 to Siegal, there are disclosed character recognition systems incorporating a matrix of pre-inscribed circular marks on a work sheet. These are also paper and ink based systems. Here, instead of chemically treated regions which force the markings to be in well registered locations, as in the Martinson patent, the user is expected to memorize a character set and form each character so that parts of the character fall within designated pre-inscribed circular marks. As with the Martinson patent, there is no dialogue in which the computer system and the user agree upon the form of the character to be recognized.

In the article "Computer Identification of Constrained Handprinted Characters with a High Recognition Rate" (IEEE Transactions on Systems, Man, and Cybernetics: November, 1974; p.497ff), a method of handwriting recognition is described in which "49 constrained characters" are enterable by hand printing the constrained characters on a grid printed on paper, then placing that paper in the view of a computer equipped with a TV camera input. The grid in this system is nearly identical to the template disclosed in the present invention. However, the system described in the article is an optical character recognition system. There is no dialogue between the computer and the user to agree upon the character to be recognized. Rather, the system uses a feature extraction and best match recognizer to identify the character.

In U.S. Pat. No. 3,776,454 to Jones a five by three array of light colored boxes is provided at regular intervals on a dark background. The user may enter a decimal number by blackening those boxes which do not belong to the number. Here again there is no dialogue between a computer system and the user.

Japanese Patent Nos. 62-20086, 62-20087, and 62-20089 deal with a method for producing written characters which can be read easily by an optical character reader. In 62-20086 and 62-20087 the user is provided with an array of lines which may be traced to create numerals. In 62-20089 a pattern of rectangles is provided which, when used with a described character set, support accurate reproduction of that character set. The patent does not address any technology for recognizing the user production but only offers a tool for regularizing the production so that recognition is easier. As with the earlier discussed patents, there is no computer-user dialogue in which the computer and the user agree upon the form of the character to be recognized.

In U.S. Pat. No. 3,733,468 to Eberly, there is disclosed a means for manually producing alphanumeric characters readable by an optical scanner. The line segments of a template are embossed as grooves on paper, and the grooves then guide the stylus point forcing regular characters to be formed. This system can not be recreated on a handwriting capture tablet without the addition of mechanical templates or robotic devices. As with much of the prior art already discussed, this invention depends upon constraints which conform user writing strokes to predefined alternatives. The Eberly patent achieves this constraint with the aid of a mechanical device. While this technique allows for much simpler character recognition devices, it does not take advantage of the natural handwriting skills of users.

A second category of prior art teaches character entry on an electronic device.

An article entitled "Handprinted Data Entry with a Touch-Sensitive Numeric Keypad" (Proceedings of the Human Factors Society 33rd Annual Meeting, 1989, p.305ff by Georg Geiser) describes a methodology for constructing a set of 30 "line elements" on a three by three array of buttons by a certain "stroking" motion. These line elements are used to "write" characters via the array of buttons. The recognition system "decodes" a series of button presses. The stroke path is necessarily constrained to a small keypad. There is no difference between the user entered "stroke" and the displayed segments. The methodology described cannot easily be expanded to support cursive handwriting entry or logic or flow chart capture.

U.S. Pat. No. 4,005,400 to Engdahl discloses a stylus-operated two-by-two switch array for generating numbers on a small pad, such as might be found on a watch calculator. The patent describes how different numbers can be generated by different sequences of "strokes" on the array. There is no dialogue between the computer system and the user, and character recognition decoding is based upon the sequence in which the "strokes" are made.

In U.S. Pat. No. 4,199,751 to Piguet, a variety of small keyboards are described for character entry. The keyboard buttons are so arranged that they correspond to the segments of a single character display. The user creates characters by pushing buttons. No use is made of the natural handwriting style of the user.

U.S. Pat. No. 3,487,371 to Frank discloses a terminal for block character entry and recognition. The user is expected to print on paper, within boxes which may contain "reference markings which constrict the writing of the characters in the box." While this system does present a user interface for handwriting input and a mechanism for displaying to the user each entered character as it is recognized, it has no dialogue phase. "Contour following" and "feature extraction" techniques are used to recognize the entered characters.

SUMMARY OF THE INVENTION

It is therefore an object of the present invention to provide a method of handwriting recognition for computers which separates the act of stylus input by the user from the process of recognition by means of a stage providing visual feedback to the user.

It is a further object of the invention to provide a handwriting recognition technique which takes advantage of handwriting motor skills already developed by the user.

It is also an object of the invention to provide a handwriting input devices that allows the user the opportunity to see the character as it develops into finished form and before the recognizer is invoked.

It is another object of the invention to provide a handwriting recognition system wherein characters may be touched up to correct character shape, a feature that current dynamic recognizers do not support.

It is a further object of the invention to establish a dialogue between a computing system and a user, thereby allowing the user to decide that the character is recognizable or to make it so before asking the computer to recognize it.

It is also an object of the invention to provide a method of handwriting recognition which is adaptable to cursive handwriting and to the capture of logic diagrams and flow charts.

It is an object of the invention to overcome particular problems in recognition of cursive handwriting, namely, locating ligatures between characters and recognizing the separated characters.

It is a further object of the invention to provide a method of handwriting recognition that requires a minimum of code space and data space for implementation on a computing system.

According to the invention, a template of distinct (grey, dotted, or otherwise distinguishably unselected) line segments displayed upon an electronic writing surface serves as a reference for handwritten strokes recorded on the writing surface by means of a stylus. As the strokes which define a character are traced over the template lines by the user, first the locus of each stroke is displayed. When the stylus is lifted at the end of each stroke, the stroke disappears and is replaced by darkening the template line segments which are found to correspond to the recorded strokes. In this way the user may construct a character for recognition using handwriting-like motions.

This process allows the user to see the template constrained characters take shape, piece by piece, even though the user does not follow precisely the line segments which make up the template. There is, thus, a dialogue between the user and the computing system which allows relatively unconstrained reliance upon the handwriting skills of the user to produce well defined characters conforming to the constraints of the template. The dialogue continues until the user is satisfied that the template line segments thereby selected form a recognizable character.

Provisions can be made for revision of incorrectly drawn characters. A retrace of a line could be made to return that line of the template to its original state. A button, of a kind commonly found in modern graphical user interfaces, could be used to clear the whole template. Other character revision scenarios will occur to those skilled in the user interface art.

A recognition phase follows the template tracing phase. In this phase, the distinct, darkened template lines are identified and a reference number for that pattern is constructed. This reference number is then used as an index into a table in which the computer coded version of the character is stored in the referenced position. The "recognized" character may then be displayed in place of the template or elsewhere on the display screen. The table can be revised during the recognition process so as to adapt to the handwritten forms of the user.

Because of the simplicity of this scheme both the data space and the code space requirements for the recognizer are very small. The code space is small because of the simplicity of the algorithms which generally can be table driven. The data space is small because it is defined by a simple referent and referenced data structure.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
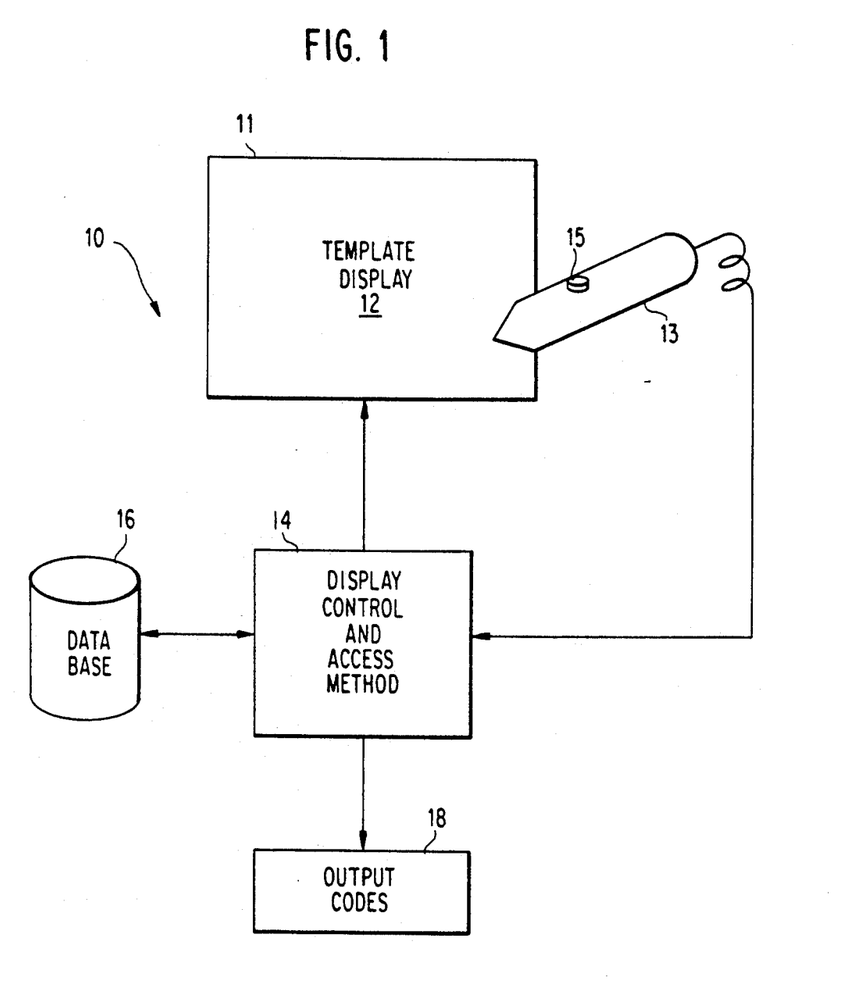
FIG. 1 is as block diagram showing the basic components of the overall handwriting recognition according to the invention.

An electronic writing surface, or tablet, is a device consisting of a computer display, and an electronic stylus and digitizer for writing on the display surface. This combination input and output device is commercially available from several manufacturers. As shown in FIG. 1, the handwriting recognition system 10 according to the invention comprises a writing tablet 11 providing a display 12 on which templates, stylus traces, and computer generated characters can be shown, as described in more detail hereinafter. The writing tablet 11 cooperates with a stylus 13 to provide output to the display control and access method 14.

Based on the user input via the stylus 13, the display control and access method 14 first engages in a dialogue with the user by capturing the input strokes and displaying the strokes until the user is satisfied with the input as represented on the writing tablet 11. This dialogue is described in more detail with respect to the description of FIG. 2 and the following figures. Once the user input is complete for a symbol, the display control and access method 14 accesses a database 16 in order to determine the code for the symbol. If no code is found in the database 16, the display control and access method 14 prompts the user to select a symbol and performs an update of the data stored in the table. The codes for the input symbols are output at 18 for use by a data processing system which requires the input.

Figure 2:
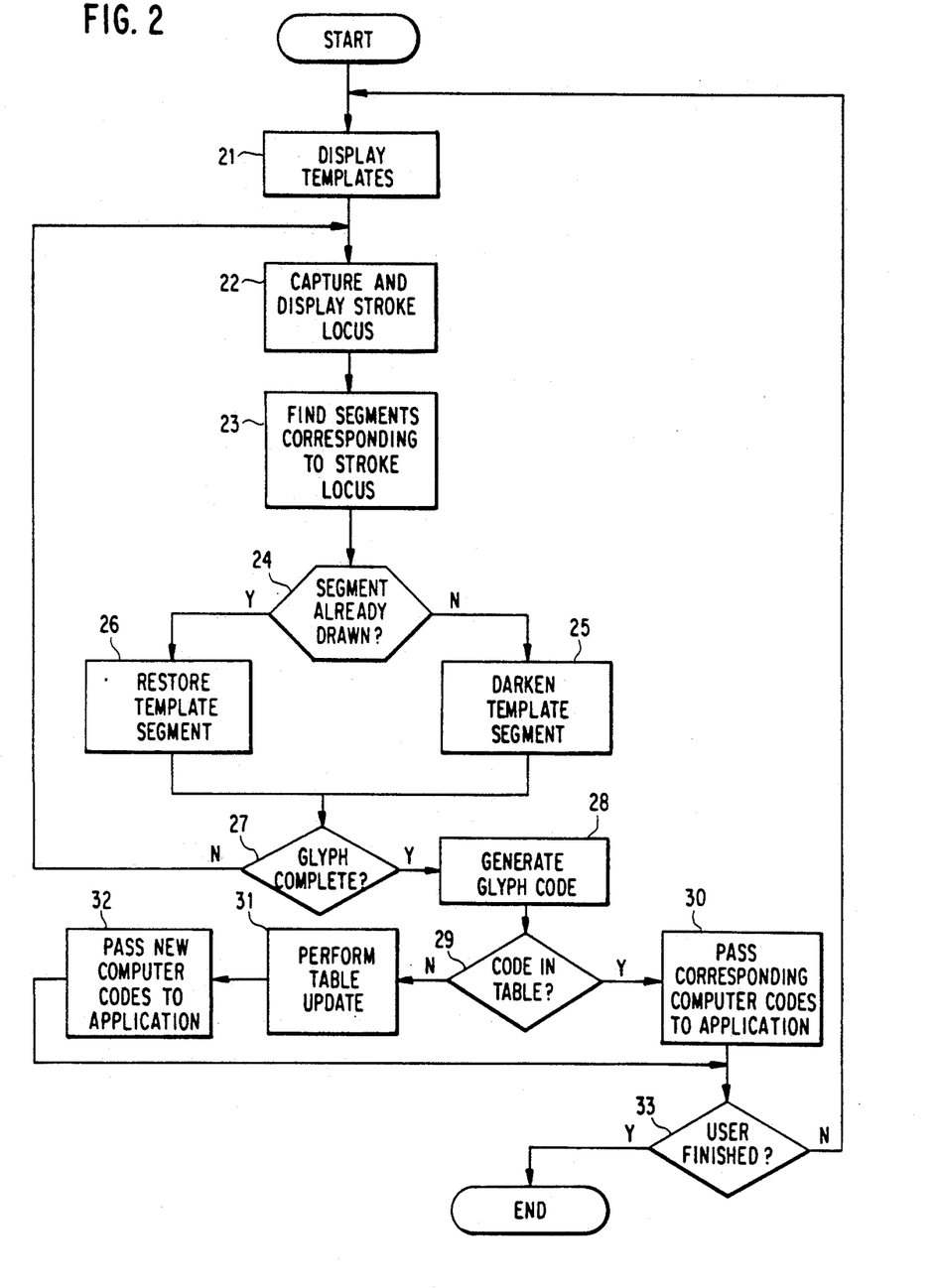
FIG. 2 is a flow diagram illustrating the logical operation of the invention.

Referring next to FIG. 2, the process of character entry and recognition performed by the display control and access method 14 shown in FIG. 1 proceeds, according to the invention, through five steps. The first step is to display a template (or array of templates) in function block 21 on the electronic writing surface using unobtrusive colors or patterns. A template is composed of straight or curved lines formed of dots implying lines or from solid lines which are sufficiently dim or similar to the display background that, while they can be easily seen, can also be easily distinguished by the user's eye from darker lines formed by the computer to display the trace (or "ink") left by movement of the electronic stylus on the tablet. The lines on the template offer guidance to the user for making strokes via the electronic stylus.

The template is so structured that at least one combination (and very possibly many combinations) of the lines could be traced by the user to create legible representations of symbols. Such templates may be designed by superimposing the members of the set of characters to be recognized and merging lines which approximate one another but do not overlap. Such basic templates may be further refined.

The second step is to capture and display the locus of the user's stylus stroke on the tablet. Drawing these loci is the user's contribution to a dialogue between the computing system and the user. The dialogue begins when the user puts the stylus onto the electronic writing surface and begins writing. In order to enter a symbol, the user traces that symbol on the template by means of a series of input strokes. These are captured and displayed in function block 22. Each stroke evokes a response from the computing system. Each stroke is recorded on the display in the form of "electronic ink", which remains until removed by the computing system.

Following this, in the third step the computing system contributes to the dialogue in function block 23 by analyzing the just completed input strokes and determining whether a segment has been traced, and if so, determining which template segment the user traced. At each stage in the dialogue, having determined which template segment the user traced, the computing system removes the original "electronic ink" and either traces, in function block 25, or restores to normal, in function block 26, the selected template segment, depending on the outcome of the test made in decision block 24 on the prior state of the template segment. In effect, the strokes drawn by the user are "snap drawn" in function block 25 to the closest line segments on the template, forming a "glyph"; i.e., a fiqure composed of those template segments which have been "snap drawn" or traced. "Snap drawing" or erasing by the computing system can be triggered by one or more of several detectable Events, such as lifting the stylus or movement of the stylus to another template.

Figure 9:
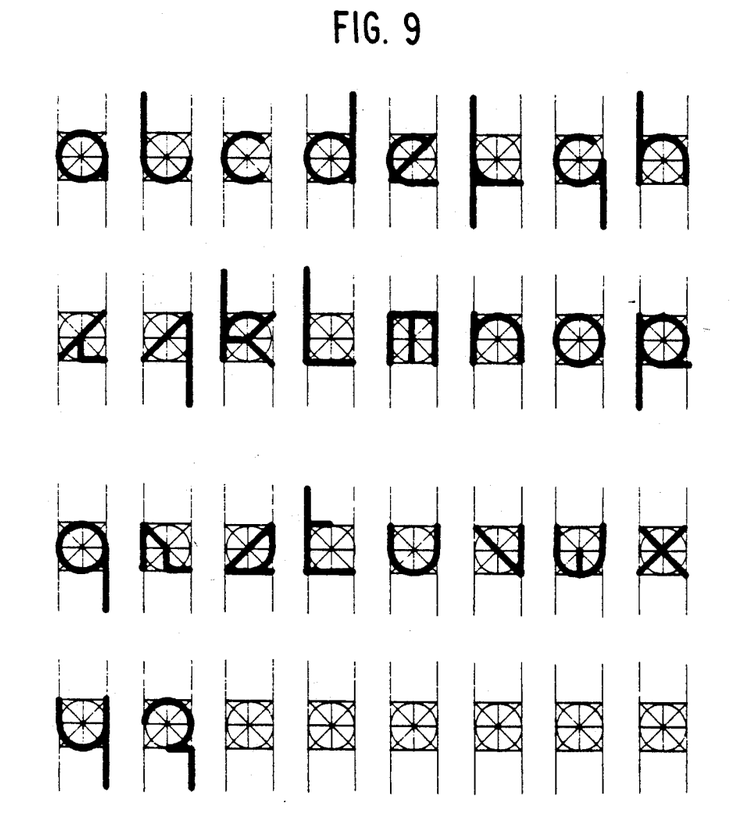
FIG. 9 is a series of template illustrations showing cursive character representations in conformance with the template shown in FIG. 7.
Figure 10:
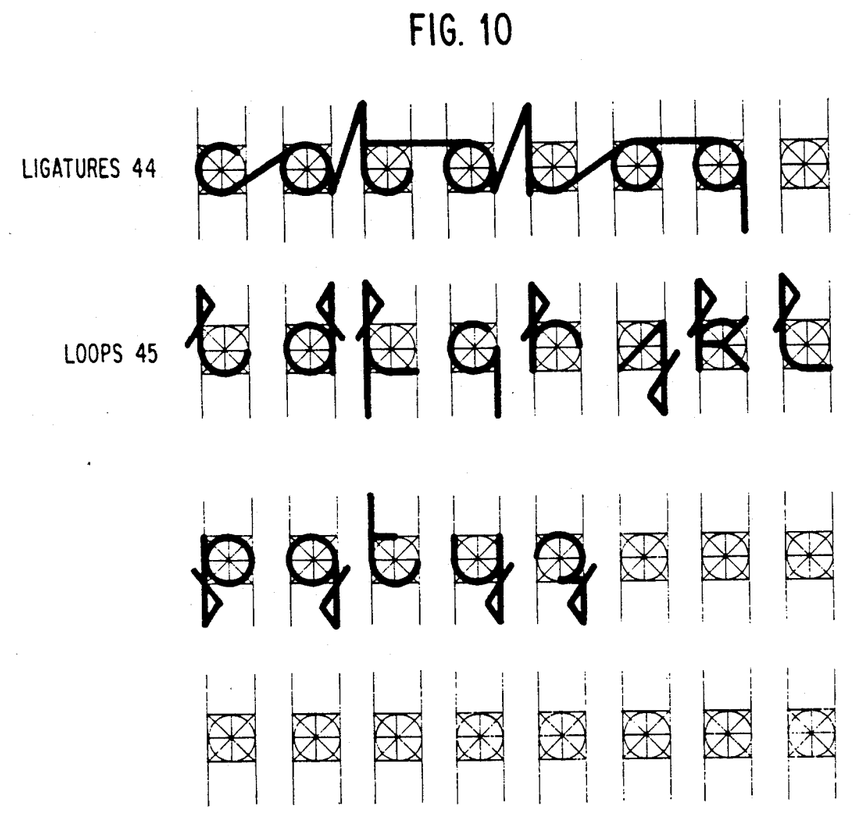
FIG. 10 is a series of template illustrations showing cursive character representations in conformance with the template shown in FIG. 7, but enhanced for user recognition clarity by the addition of lines not contained in the template.

In addition, at the time of "snap drawing", the computer system can also enhance the glyph for the purpose of making the glyph more legible to the user. This step only requires that the snap algorithms for the template segments contain a description which differs from the template descriptions appropriately. For example, FIG. 10 shows loops which improve the legibility of certain character representations shown in FIG. 9. Similarly, ligatures may be drawn by using well known line drawing algorithms to draw connecting lines from the last point "touched" of a template to the first point touched of the next template. These techniques are probably helpful only in the case of cursive writing entry.

The user can touch up the glyph by adding line segments or by erasing line segments, until satisfied that the appearance of the glyph legibly represents a symbol. The decision to erase or draw a line segment is made at decision block 24 on the basis of the current state of the template segment. After this dialogue between computing system and user has ended and the glyph is complete as determined in decision block 27, a much simplified recognition process may then proceed. The user terminates the glyph forming dialogue by moving to the next template or by some environment specific action (such as pressing a graphical user interface button).

This step begins the recognition process. The computing system traverses the data structure representing the template segments just entered, generating a code in function block 28 which uniquely identifies the combination of traced segments. The code for a given combination of segments will be the same, regardless of the order in which the segments were drawn by the user. This unique code is compared to entries in a table in database 16 (shown in FIG. 1), each said entry consisting of a glyph code and a corresponding computer code (such as an EBCDTC or ASCTI code) or a string of codes. If there is a match between the glyph code and an existing glyph code entry in the reference table as determined in decision block 29, the corresponding computer code (or string of codes) is output at function block 30. If there is no match, the user is prompted in function block 31 to add a glyph code and corresponding computer code (or computer code strings) to the list, thereby adding a new entry to the data. The new code (or codes) will then be output at function block 32. This process is then repeated until the user input is finished as determined by decision block 33.

If the application is simply the display of recognized characters, the recognized character can be displayed upon the display panel of the electronic writing tablet 11. Appropriate software means can be employed to insert a recognized character's computer codes into the keyboard input stream of software executing on a data processing system. Thus, the system described above may be used as a replacement or a supplement for a computer keyboard. Following this action, it is determined whether or not the user has completed the dialogue.

Figure 3:
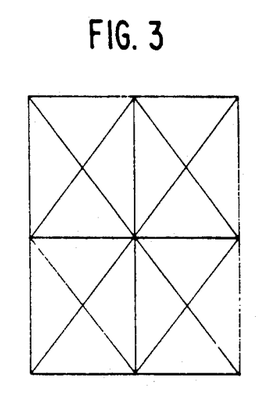
FIG. 3 is a template consisting of straight line segments.
Figure 4:
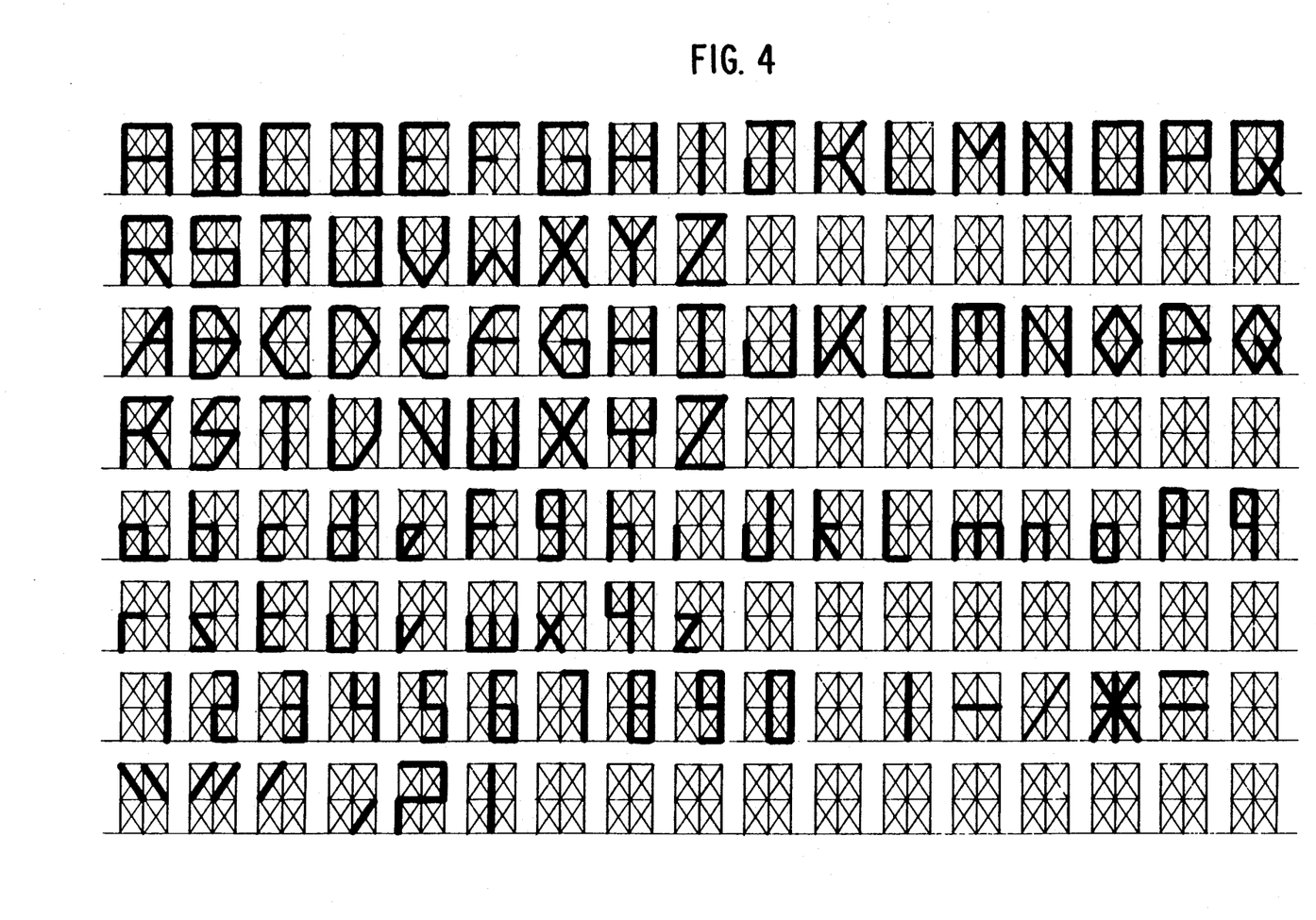
FIG. 4 is a series of template illustrations showing at least one version of each English character in conformance with the template shown in FIG. 3.
Figure 7:
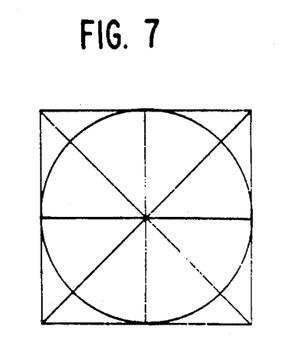
FIG. 7 is template of straight and curved line segments designed for cursive writing.

The appearance to a user of the handwriting recognition process can be described by reference to the template of straight line segments shown in FIG. 3 and following figures. The pattern of lines shown in FIG. 3 allows the tracing of at least one version of each of the English capital letters, lowercase letters, integers, some punctuation marks, and some special symbols, as illustrated in FIG. 4. Other templates with more or different line segments or with dots or with combination of dots and lines could be employed with similar effect, as shown for example in FIGS. 7, 8 and 9.

Figure 5:
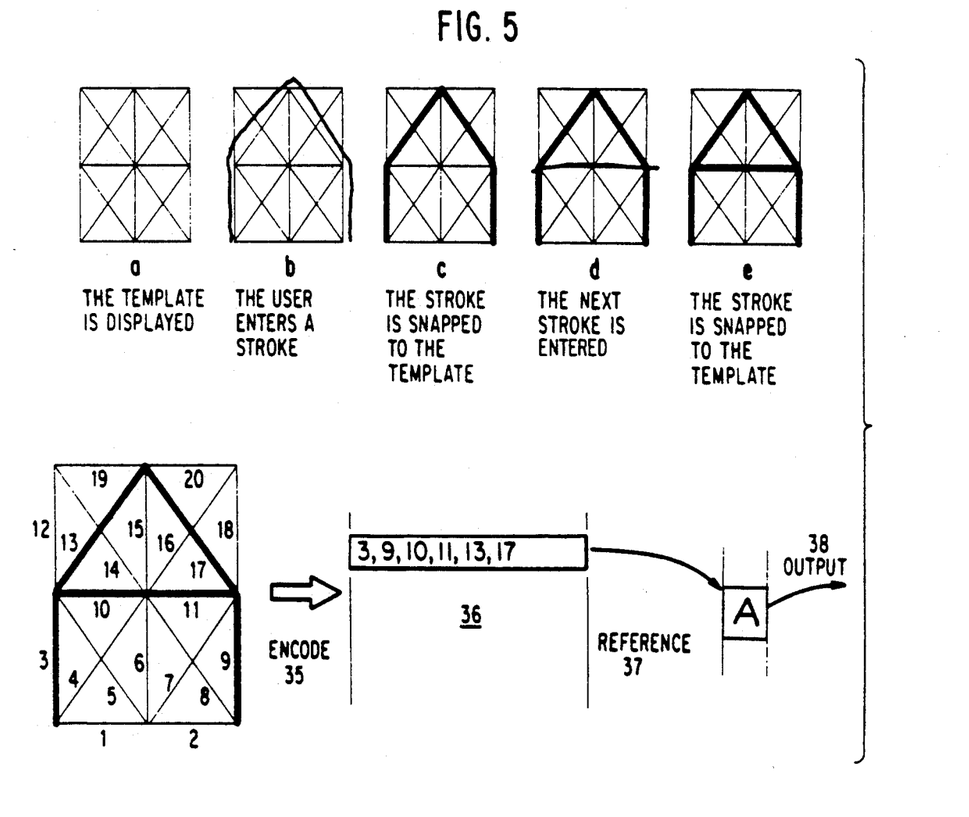
FIG. 5 is a sequence of template illustrations showing the process of character entry in conformance with the template shown in FIG. 3.

FIG. 5 illustrates how the recognizer operates to recognize a handwritten character. At a is a copy of FIG. 3 and represents a blank template displayed to the user. The user enters a stroke upon the template by touching a stylus to some point near one of the line segments in the template, tracing a continuous line, and then lifting the stylus upon completion. Such a stroke is illustrated at b.

In this implementation the trigger for the computing system to analyze the stroke is the lifting of the stylus. This is the easiest trigger to detect and allows a simpler software system. Other implementations, for example those for cursive writing where the stylus does not often leave the electronic writing surface, may use additional triggering techniques so that the user can see the results upon the template of each stroke as each character is being drawn.

As soon as the stylus is lifted, the recognizer "snaps" the stroke to lines of the template, as illustrated at c. The user enters the next stroke in similar fashion, as illustrated at d. When the stylus is lifted the recognizer "snaps" the stroke to the lines of the template. The result of this process is shown at e.

When the user has completed the character, which could be indicated by the user pressing a button or by beginning the next glyph, the recognizer processes the data structure which represents the glyph by encoding the segments which were selected in the "snap" operations. This process is shown at 35. Each line segment in the template is represented by a unique designator from a set of designators (in this instance the set of integers from 1 to 20), as shown at 36. The recognizer constructs from the completed glyph an ordered sequence of designators 36 corresponding to the template line segments which were selected in the "snap" operations. The recognizer then compares the ordered sequence to entries in a reference table, as shown at 37. If the ordered sequence matches an entry in the table, the corresponding computer code entry is output at 38.

If the user is satisfied with the character but the ordered sequence does not match an entry in the table, the user can be prompted for alternate input to identify the character, and a new entry corresponding to this identification can then be added to the reference table. In this way the recognizer can be "trained".

It is an important feature of the claimed invention that the user see the effect upon the template of each stroke while the character is being drawn. The user may then add strokes as necessary to produce the desired glyph. If the user is unsatisfied with particular line segments in the glyph those may be deleted by retracing them. Similarly, a software "button" may be used to return the template to its original state. In this way the user can correct the glyph until satisfied with its appearance.

Figure 6:
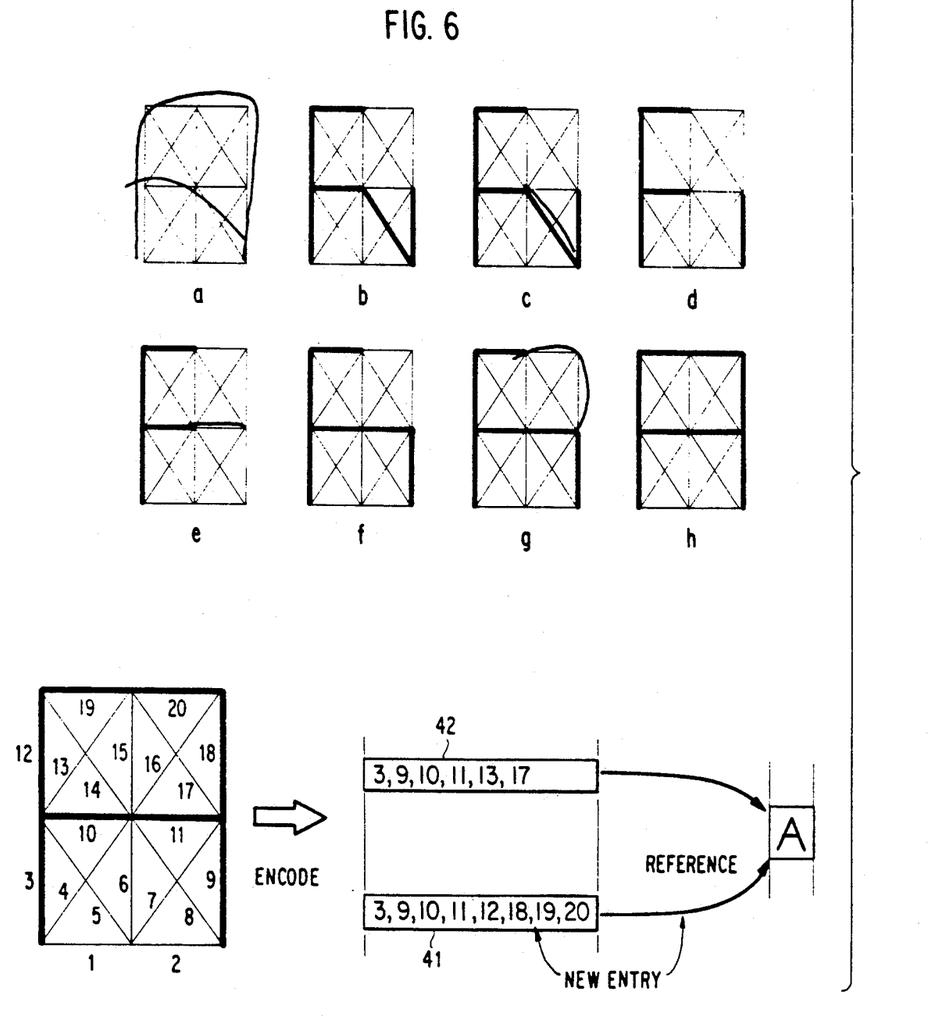
FIG. 6 is a second sequence of template illustrations showing the process of character entry in conformance with the template shown in FIG. 3.

These aspects of the recognition process are shown in FIG. 6. The initial strokes drawn by the user are shown at a, and the corresponding "snap" version of these strokes is shown at b. The user makes two corrections. First, the diagonal line segment in the lower right quadrant of the template is removed by drawing a stroke along that line segment, as shown at c. The "snap" for this stroke cancels out the diagonal line segment in the lower right quadrant of the template, as shown at d. Then a stroke in drawn along the desired line segment, as shown at e. The result after this stroke is "snapped" is shown at f. Second, an additional stroke is added to the upper right quadrant of the template, as shown at q, producing after the "snap" the final character shown at h.

The recognizer then constructs from the completed character an ordered sequence of designators corresponding to the template line segments which were selected in the "snap" operations. However, the resulting sequence of designators, shown at 41, does not match the existing entry in the reference table for the letter "A", shown at 42. The user can then select the letter "A" as the character corresponding to the new sequence of designators, thereby adding another datum to the reference table.

A typical embodiment is provided with a standard glyph-to-datum mapping. For example, each template shown in FIG. 4 translates into an entry in a reference table. This mapping is enhanced by the user by updating or adding to the reference list. A comparable mapping for a template designed for cursive writing can be derived from the template (FIG. 7) as shown in FIG. 9.

Figure 8:
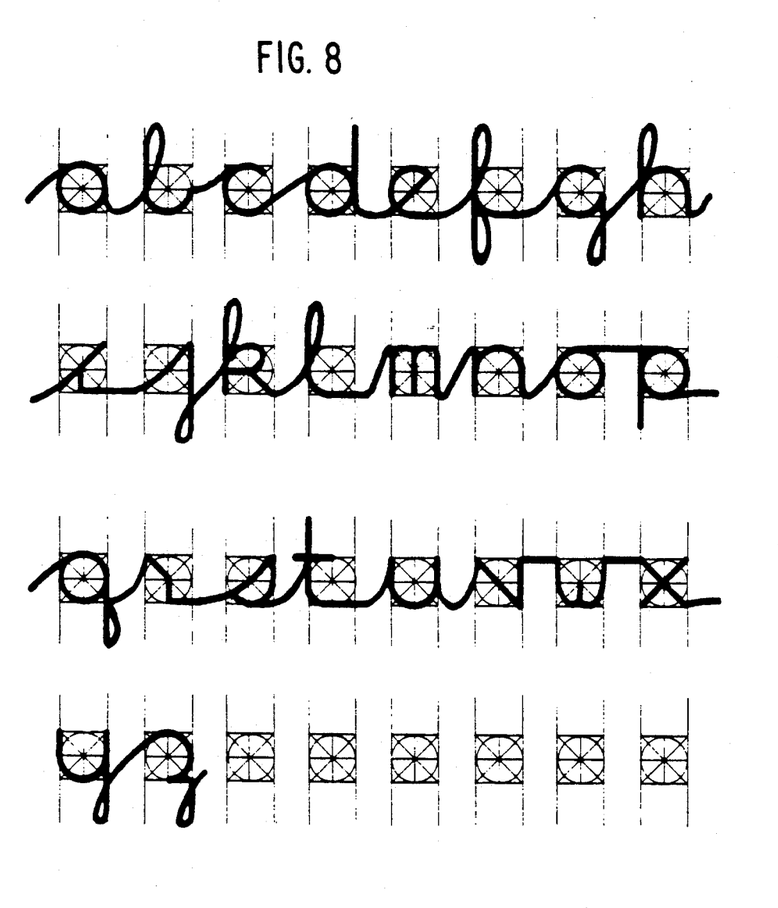
FIG. 8 is a series of template illustrations showing cursive characters as they might be written on the template shown in FIG. 7.

The application of the cursive template is shown in FIG. 8, where the lower case script alphabet is written over a series of templates. FIG. 9 shows the snapped forms which result. As shown, for cursive writing, lines connecting templates (the ligatures) are eliminated by the snapping action. FIG. 10 shows two means for enhancing the readability of the snapped forms: synthesis of ligatures 44 and addition of loops 45. In this embodiment of the cursive system it is assumed that the user completes a word and touches up prior to moving to the next word. Snapping can be triggered by movement between two templates with the stylus down. Recognition can be triggered by movement to a new template with the stylus up, or with a software button.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method of data entry using a graphic input and display tablet and a character recognition system including the steps of
    displaying a template which defines strokes which can be recognized by said character recognition system,
    inputting a locus on said graphic input and display tablet including a step of displaying said locus,
    determining that entry of said locus is complete,
    converting said locus to a glyph comprising one or more strokes of said template and displaying said strokes of said template corresponding to said locus while removing display of said locus,
    determining that entry of said glyph is complete, and
    generating a code corresponding to said one or more strokes in response to said step of determining said glyph is complete.

2. A method as recited in claim 1, including the further step of
    touching up said strokes displayed by said step of displaying strokes corresponding to said locus.

3. A method as recited in claim 2, wherein said step of touching up said strokes displayed by said step of displaying strokes of said template corresponding to said locus comprises the further steps of
    inputting a further locus on said graphic input and display tablet,
    converting said further locus to one or more strokes of said template corresponding to said further locus,
    comparing a stroke of said template corresponding to said further locus with each stroke of said template corresponding to said locus,
    displaying or erasing from the display at least one stroke corresponding to said further locus in response to at least one result of said comparing step.

4. A method as recited in claim 1, wherein said step of displaying strokes of said template corresponding to said locus further includes
    displaying a glyph corresponding to at least one segment of said template, said glyph having an appearance differing from but positionally related to said at least one stroke.

5. A method as recited in claim 4, wherein said step of displaying a glyph includes at least one of the steps of
    displaying at least one of a looped riser and a looped descender, and
    displaying a ligature.

6. A method as recited in claim 1, including the further steps of
    determining when said step of generating a code finds no code corresponding to said one or more strokes and, responsive thereto,
    prompting a user to designate a symbol corresponding to said strokes displayed by said step of displaying strokes corresponding to said locus and a code corresponding to said strokes displayed by said step of displaying strokes corresponding to said locus.

7. A method as recited in claim 1, wherein said graphic input and display tablet includes a plurality of said templates, said method including the further step of
    determining movement of said locus between ones of said plurality of templates.

8. A method as recited in claim 7, including the further step of
    synthesizing ligatures corresponding to said locus responsive to said step of determining movement of said locus between ones of said plurality of templates.

9. A method as recited in claim 7, wherein said step of converting said locus to one or more strokes is conducted in response to said step of determining movement of said locus between ones of said plurality of templates.

10. A method as recited in claim 9, including the further step of
    synthesizing ligatures corresponding to said locus responsive to said step of determining movement of said locus between ones of said plurality of templates.

11. A data entry arrangement using a graphic input and display tablet and a character recognition system including
    means for displaying a template which defines strokes which can be recognized by said character recognition system,
    means for inputting a locus on said graphic input and display tablet including means for displaying said locus,
    means for determining that entry of said locus is complete,
    means for converting said locus to a glyph comprising one or more strokes of said template, including means for displaying said strokes of said template corresponding to said locus and removing display of said locus,
    means for determining that entry of said glyph is complete, and
    means for generating a code corresponding to said one or more strokes displayed and corresponding to said locus responsive to said means for determining that entry of said glyph is complete.

12. An arrangement as recited in claim 11, further including a stylus and means for touching up said strokes displayed by said means for displaying strokes corresponding to said locus.

13. An arrangement as recited in claim 12, wherein said means for touching up said strokes corresponding to said locus further includes means for capturing a further locus on said graphic input and display tablet, means for converting said further locus to one or more strokes of said template corresponding to said further locus, means for comparing a stroke of said template corresponding to said further locus with each stroke of said template corresponding to said locus, means for controlling said means for displaying said strokes corresponding to said locus to display or erase at least one stroke corresponding to said further locus in response to said means for comparing a stroke of said template corresponding to said further locus with each stroke of said template corresponding to said locus.

14. An arrangement as recited in claim 11, wherein said means for displaying strokes of said template corresponding to said locus further includes means for displaying a glyph corresponding to at least one segment of said template, said glyph having an appearance differing from but positionally related to said at least one stroke.

15. An arrangement as recited in claim 14, wherein said means for displaying a glyph includes at least one of means for displaying at least one of a looped riser and a looped descender, and means for displaying a ligature.

16. An arrangement as recited in claim 11, further including means for determining when said means for generating a code finds no code corresponding to said one or more strokes, means for prompting a user to designate a symbol corresponding to said strokes displayed by said means for displaying strokes corresponding to said locus and a code corresponding to said strokes displayed by said means for displaying strokes corresponding to said locus, said means for prompting a user being responsive to said means for determining failure of said means for generating a code.

17. An arrangement as recited in claim 11, wherein said graphic input and display tablet includes a plurality of said templates, said arrangement further including means for determining movement of said locus between ones of said plurality of templates.

18. A method as recited in claim 17, wherein said means for converting said locus to one or more strokes is responsive to said means for determining movement of said locus between ones of said plurality of templates.

* * * * *